(12) United States Patent
Poon et al.

(10) Patent No.: US 10,432,311 B1
(45) Date of Patent: Oct. 1, 2019

(54) METHODS AND SYSTEMS FOR OPTIMIZING NETWORK CATCHMENT AREAS

(71) Applicants: Khalifa University of Science, Technology and Research, Abu Dhabi (AE); British Telecommunications PLC, London (GB); Emirates Telecommunications Corporation, Abu Dhabi (AE)

(72) Inventors: Kin Fai Poon, Abu Dhabi (AE); Fabrice Saffre, Abu Dhabi (AE); Kaltham Saeed Khalfan Alromaithi, Abu Dhabi (AE); Anis Ouali, Abu Dhabi (AE); Beum Seuk Lee, Abu Dhabi (AE)

(73) Assignees: Khalifa University of Science and Technology, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 0 days.

(21) Appl. No.: 16/051,869

(22) Filed: Aug. 1, 2018

(51) Int. Cl.
 *H04J 14/00* (2006.01)
 *H04B 10/2575* (2013.01)
 *H04B 10/27* (2013.01)

(52) U.S. Cl.
 CPC ....... *H04B 10/25753* (2013.01); *H04B 10/27* (2013.01)

(58) Field of Classification Search
 CPC .............. H04B 10/27; H04B 10/25753; H04B 10/272; H04J 14/14; H04J 14/0227
 (Continued)

(56) References Cited

U.S. PATENT DOCUMENTS

| | | | |
|---|---|---|---|
| 2003/0099014 A1* | 5/2003 | Egner | H04J 14/0227 398/79 |
| 2010/0040365 A1* | 2/2010 | Kit Leung | H04J 14/0227 398/26 |
| 2010/0149984 A1 | 6/2010 | Kapoor et al. | |

FOREIGN PATENT DOCUMENTS

| | | |
|---|---|---|
| CA | 2894341 A1 | 12/2016 |
| EP | 2426837 A1 | 3/2012 |

(Continued)

OTHER PUBLICATIONS

Y. Kim, Y. Lee, and J. Han, "A splitter location/allocation problem in designing fibre optic access networks," European Journal of Operational Research, vol. 210, No. 2, pp. 425-435, Apr. 2011.

(Continued)

*Primary Examiner* — Hanh Phan
(74) *Attorney, Agent, or Firm* — Calfee, Halter & Griswold, LLP (57) ABSTRACT

This invention relates to methods and systems for optimizing network catchment areas, in particular based on completion times of the customer premises. Embodiments of the invention aggregate different customer premises to form demarcated catchment areas by minimizing the overall weighted cost function comprising the distance and completion time within each catchment area, while also considering practical constraints. Embodiments of the invention allow network planners to specify their preferences of distance against time to produce cost-effective network schemes for very large numbers of customer premises and form network catchment areas without any overlapping.

8 Claims, 7 Drawing Sheets

(58) Field of Classification Search
USPC ........ 398/66, 67, 68, 69, 70, 71, 72, 98, 99, 398/100, 79, 58, 59, 115, 25, 26, 27; 370/352, 392, 389, 468, 465
See application file for complete search history.

(56) References Cited

FOREIGN PATENT DOCUMENTS

| | | |
|---|---|---|
| WO | WO2010112845 A1 | 7/2010 |
| WO | WO2013169200 A1 | 11/2013 |
| WO | WO2016026656 A1 | 2/2016 |

OTHER PUBLICATIONS

J. Li and G. Shen, "Cost minimization planning for Greenfield passive optical networks," Optical Communications and Networking, IEEE/OSA Journal of, vol. 1, No. 1, pp. 17-29, Jun. 2009.

B. Lakic and M. Hajduczenia, "On optimized passive optical network (PON) deployment," in Access Networks Workshops, 2007. AccessNets '07. Second International Conference on, 2007, pp. 1-8.

K. Poon, A. Ouali and B. Lee, "Physical layer design of optical networks with practical considerations," 2014 IEEE International Conference on Industrial Engineering and Engineering Management, pp. 1342-1346, Dec. 2014.

\* cited by examiner

METHODS AND SYSTEMS FOR OPTIMIZING NETWORK CATCHMENT AREAS

FIELD OF THE INVENTION

The present invention relates to methods and systems for optimizing network catchment areas. It is particularly, but not exclusively, concerned with techniques for aggregating different customer premises to form demarcated catchment areas, and in particular based on completion times and location of customer premises.

BACKGROUND OF THE INVENTION

In today's telecommunications market, competition among different operators is fierce. Many telecom operators are trying to expand their services, lower their prices to customers and apply different innovations to provide services in a cost effective manner. However, the costs associated with the design and build of new networks are very high, and upgrading legacy networks can be prohibitively expensive. Furthermore, the disruption incurred in maintaining an existing network should be minimized as much as possible.

When considering the physical layer design of new-build telecom local access networks, in general, many factors such as network equipment dimensioning and positioning, cables and ducts routing, and road trenching are taken into account.

Figure 1:
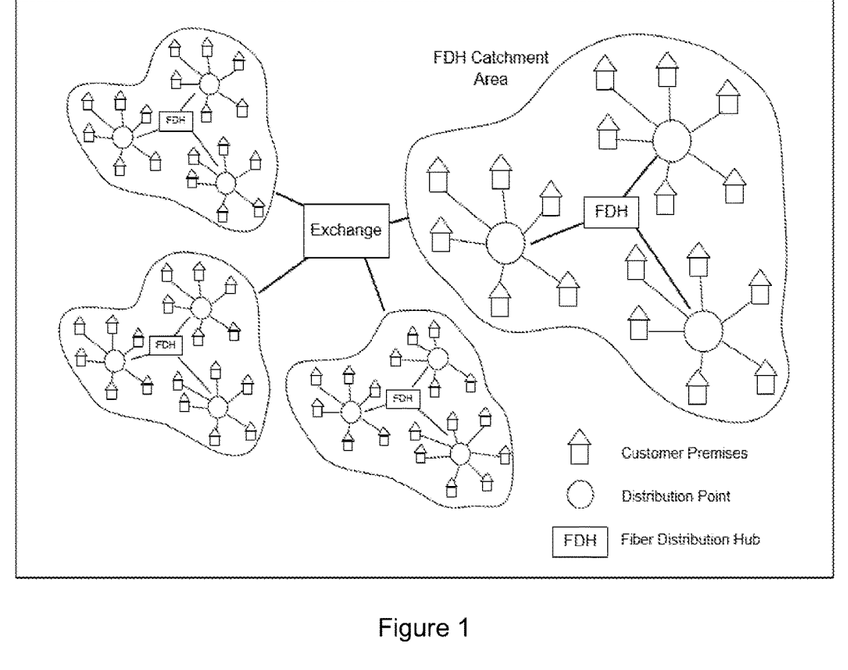
FIG. 1 shows, schematically, a typical example of the use of network catchment areas and has already been described.

A first step in network design is often to dissect an entire exchange into a manageable way (i.e. divide it into a plurality of individual "catchment areas"). FIG. 1 shows a typical example of network catchment areas where customer premises and distribution points are grouped together with a head end equipment called a Fibre Distribution Hub (FDH). A FDH is used to house hardware devices, typically optical splitters, which split the incoming optical signal from an exchange and distribute the signal to an individual Distribution Point (DP). A DP can also be considered as a small catchment area to group the customer premises together, and further distributes the fibre cables to individual customer premises.

Traditionally, the network design is achieved manually based on planners' domain knowledge. The formation of catchment areas is achieved simply by continuing to determine the locations of FDHs manually and to assign the customer premises to the selected FDHs until the FDHs reach the maximum capacity. Due to the size of given networks (typically over a thousand customer premises) with the consideration of many different practical factors such as the connection capacity of each FDH and the maximum allowable distance between a FDH to customer premises, a manual solution may not be cost effective and is often far from optimum. In addition, the network designs are often created under tight time scales and the quality is dependent on the planners' experience.

Whilst it is possible to automate the network design process, several issues tend to hinder the use of existing automated planning systems/methods to achieve an optimal and/or a cost effective design of the catchment areas.

One important issue in many network deployments is the consideration of the time element for each customer with regards to the provision of an effective planning design. Many existing approaches only focus on the locations of the customer premises with the aims of laying the shortest cables or ducts to reach the customer premises. However, if the completion dates of premises are not taken into account, deploying the network infrastructure in advance without being able to minimize the cabling distance and the number of network equipment may not be the best practice.

Often the concept of phased network deployment is used. A set of customer premises is identified in advance roughly based on their completion dates to form an individual catchment area for network deployment. Planners simply group the premises together with similar completion dates which may result in overlapping of catchment areas. Cables running from customer premises to the network equipment in catchment area A may intersect the cables running from premises to the network equipment in catchment area B. The overlapping of catchment areas is considered to be a bad practice due to the maintenance difficulties of tracking the cables for the individual customers. Furthermore, from the network deployment point of view, cables, joint boxes, main and lead-in ducts are very often installed within each catchment area connecting to the head-end equipment of the identified area. Therefore, avoiding overlapping catchment areas is important.

Another area for potential improvement is flexibility. The completion date of each block of customer premises is not necessarily similar to that of adjacent block.

Finally, traditional planning methods, either automated or manual based, are static and inflexible. As a result, conventional approaches are unable to handle the time and space aspects of the customer premises for the network deployment with a lower cabling distance while satisfying the practical constraints.

For example WO2013169200A1 describes a method of placing ducts/cables and devices in a geographical area for fibre networks. First, a set of starting and end nodes are pre-determined. Links representing trenches are then created based on a shortest path algorithm. Once the required topology is generated, work orders will be created and uploaded to a server.

Similarly, WO2010112845A1 describes the design of an access network comprising optical fibre. It provides a very detailed description of physical connections of an optical fibre network. For example, a core network consists of a small number of core nodes to which are connected local exchanges via backhaul network. Each of the local exchanges is connected to a customer premises via an access network. Network resilience is also considered in this application. However, this document does not mention any automation related to produce a cost effective design with the time element of customers.

Technical publications such as [7], [8], [9] discuss network designs, mainly focus on Fibre To The Home (FTTH). However, they do not consider the formation of catchment areas or the completion time for an individual customer premise during the planning process.

An object of the present invention is to provide a process by which different customer premises can be aggregated to form demarcated catchment areas taking account of both the location and desired completion time of the customer premises, and preferably by minimizing the overall distance among each catchment area while considering the practical constraints. The formation of each catchment area may be based on the time and space (i.e. completion building times, locations of customer premises and the maximum capacity of each cluster).

A further object of the present invention is to provide a process which can handle a very large number of customer premises and produce a cost-effective network scheme, preferably enabling implementation of the suggested solution in a practical manner.

SUMMARY OF THE INVENTION

An exemplary embodiment of the invention provides a method of installing a telecommunications network, the network including: a plurality of customer blocks, each having a geographical position and a completion time associated with it; and a plurality of distribution hubs which will connect said customer blocks to the network infrastructure when the network is created: wherein the method includes the steps of: procuring the distribution hubs; assigning, to each distribution hub, an initial geographical position, an initial completion time; an initially assigned customer block, and a maximum number of customer blocks that can be assigned to it, wherein the initial geographical position of the distribution hub is within its initially assigned customer block, concurrently, for each distribution hub, and repeatedly, until all of the customer blocks have been assigned to a hub, or all hubs have their maximum number of customer blocks assigned to them: a) determining a customer block to be assigned to each hub by selecting, from among the group of customer blocks adjacent to blocks already assigned to that hub, the customer block which has the lowest value in a distance function that takes account of the relative geographical relationship between the block and the hub; b) assigning the selected block to the hub; and c) updating the position and completion time of the hub to take account of the position and completion time of the newly-assigned block, selecting, from a plurality of potential installation alternatives produced by said repeating steps, the installation alternative that optimises a cost function that takes account of both the relative geographical relationship between the blocks and the final determined positions of the hubs to which they are assigned and the relationship between the respective completion times of the blocks and the hubs to which they are assigned to, each installation alternative being based on different initial assignments in said assigning step; installing the hubs in accordance with the final determined positions and completion times of each hub in said selected installation alternative; and connecting the hubs to the customer blocks.

A further exemplary embodiment of the invention provides a system for planning the configuration of a new telecommunications infrastructure network, the network including: a plurality of customer blocks, each having a geographical position and a completion time associated with it; and a plurality of distribution hubs which will connect said customer blocks to existing network infrastructure when the network is created, wherein the system includes a processor, a memory and an output device, the memory is arranged store a geographical position and a completion time associated with each of said blocks; and the processor is arranged to: assign, to each distribution hub, an initial geographical position, an initial completion time, an initially assigned customer block, and a maximum number of customer blocks that can be assigned to it, wherein the initial geographical position of the distribution hub is within its initial customer block, concurrently, for each distribution hub, and repeatedly, until all of the customer blocks have been assigned to a hub, or all hubs have their maximum number of customer blocks assigned to them: a) determine a customer block to be assigned to each hub by selecting, from among the group of customer blocks adjacent to blocks already assigned to that hub, the customer block which has the lowest value in a distance function that takes account of the relative geographical relationship between the block and the hub; b) assign the selected block to the hub; and c) update the position and completion time of the hub to take account of the position and completion time of the newly-assigned block, select, from a plurality of potential installation alternatives produced by said repeating steps, the installation alternative that optimises a cost function that takes account of both the relative geographical relationship between the blocks and the final determined positions of the hubs to which they are assigned and the relationship between the respective completion times of the blocks and the hubs to which they are assigned to, each installation alternative being based on different initial assignments in said assign process; and output, to the output device, the final positions and completion times of each of the hubs, and to determine which blocks should be assigned to which hubs.

BRIEF DESCRIPTION OF THE DRAWINGS

Embodiments of the invention will now be described by way of example with reference to the accompanying drawings in which.

DETAILED DESCRIPTION

At their broadest, aspects of the present invention provide for methods and systems for planning the configuration of telecommunications infrastructure which take account of the geographical and time requirements of the new customers to be attached to the infrastructure.

A first aspect of the present invention provides a method of installing a telecommunications network, the network including: a plurality of customer blocks, each having a geographical position and a completion time associated with it; and a plurality of distribution hubs which will connect said customer blocks to the network infrastructure when the network is created: wherein the method includes the steps of: procuring the distribution hubs; assigning, to each distribution hub, an initial geographical position, an initial completion time; an initially assigned customer block, and a maximum number of customer blocks that can be assigned to it, wherein the initial geographical position of the distribution hub is within its initially assigned customer block, concurrently, for each distribution hub, and repeatedly, until all of the customer blocks have been assigned to a hub, or all hubs have their maximum number of customer blocks assigned to them: a) determining a customer block to be assigned to each hub by selecting, from among the group of customer blocks adjacent to blocks already assigned to that hub, the customer block which has the lowest value in a distance function that takes account of the relative geographical relationship between the block and the hub; b) assigning the selected block to the hub; and c) updating the position and completion time of the hub to take account of the position and completion time of the newly-assigned block, electing, from a plurality of potential installation alternatives produced by said repeating steps, the installation alternative that optimises a cost function that takes account of both the relative geographical relationship between the blocks and the final determined positions of the hubs to which they are assigned and the relationship between the respective completion times of the blocks and the hubs to which they are assigned to, each installation alternative being based on different initial assignments in said assigning step; installing the hubs in accordance with the final determined positions and completion times of each hub in said selected installation alternative; and connecting the hubs to the customer blocks.

The methods of the present aspect can quickly form network catchment areas, taking the completion time of each premises into account. The catchment areas can also be formed without any overlapping which is particularly important for the implementation and maintenance of the network in practice.

In addition, the methods of the present aspect may enable network planners to specify the relatively importance of the time and space elements by assigning different weighting factors within the cost function to generate a preferable solution.

The methods of the present aspect may also be capable of identifying the optimum number of distribution hubs (and therefore catchment areas) to minimize the cabling distance required for installation and the time deviation between the completion times of the hubs and their associated blocks.

The cost function used includes weighting factors applied to both the geographical distance between the hub and the block, and the difference between the respective completion times. This allows planners to put different emphasis on time and space to obtain desirable solutions. The choice of the weighting factors (or their relative weights) may be made based on the relative importance and/or financial cost or benefit of longer connection distances compared to earlier completion times.

In addition, both the location of each hub (for example to minimize the cabling distance between the hubs and its assigned blocks) and a priority order for the deployment of the hubs can be determined based on the final positions and completion times of the hubs.

By taking account of the capacity limitation of the hubs during the planning stage, the methods of this aspect can ensure that the capacity of the hubs is not exceeded and, preferably, that the optimum number of hubs is deployed.

The steps of installing the hubs and connecting the hubs to the customer blocks represent the final deployment of the network infrastructure in accordance with the determined arrangement and includes laying the physical cabling and connecting the respective units.

In certain embodiments the selection of the installation alternative may use a process such as a genetic algorithm, an ant colony optimization process or a simulated annealing process.

In certain embodiments the method further includes the steps of, after said determining step: checking whether the selected block is also adjacent to one or more blocks already assigned to another of the distribution hubs; and if the selected block is adjacent to blocks assigned to another distribution hub: identifying all such distribution hubs; determining the distribution hub amongst said identified distribution hubs for which the selected block has the lowest cost in said cost function; and in said step of assigning, assigning the selected block to the determined distribution hub.

Accordingly, in these embodiments, a clear decision can be made in relation to blocks which could potentially be assigned to more than one hub, such that the blocks assigned to a particular hub are contiguous and the most suitable for the position and completion time of that hub.

The step of updating may include updating the position of the hub by changing its position to the centroid of the blocks assigned to that hub.

Alternatively or additionally, the step of updating may include: checking if the completion time of the hub exceeds the completion time of the selected block and, if so, updating the completion time of the hub to the completion time of the selected block.

In addition, the method of the present aspect can be re-applied several times within a big area to form clusters of clusters. For example, an entire exchange can be dissected into several PCPs (Primary Connection Points), and then each PCP can be further divided into DPs (Distribution Points) and the connections between each planned and implemented using the methods described above.

The method of the present aspect may include any combination of some, all or none of the above described preferred and optional features.

The method of the above aspect is preferably implemented by a system according to the second aspect of this invention, as described below, but need not be.

Further aspects of the present invention include computer programs for running on computer systems which carry out the method of the above aspect, including some, all or none of the preferred and optional features of that aspect.

A second aspect of the present invention provides a system for planning the configuration of a new telecommunications infrastructure network, the network including: a plurality of customer blocks, each having a geographical position and a completion time associated with it; and a plurality of distribution hubs which will connect said customer blocks to existing network infrastructure when the network is created, wherein the system includes a processor, a memory and an output device, the memory is arranged store a geographical position and a completion time associated with each of said blocks; and the processor is arranged to: assign, to each distribution hub, an initial geographical position, an initial completion time, an initially assigned customer block, and a maximum number of customer blocks that can be assigned to it, wherein the initial geographical position of the distribution hub is within its initial customer block, concurrently, for each distribution hub, and repeatedly, until all of the customer blocks have been assigned to a hub, or all hubs have their maximum number of customer blocks assigned to them: a) determine a customer block to be assigned to each hub by selecting, from among the group of customer blocks adjacent to blocks already assigned to that hub, the customer block which has the lowest value in a distance function that takes account of the relative geographical relationship between the block and the hub; b) assign the selected block to the hub; and c) update the position and completion time of the hub to take account of the position and completion time of the newly-assigned block, select, from a plurality of potential installation alternatives produced by said repeating steps, the installation alternative that optimises a cost function that takes account of both the relative geographical relationship between the blocks and the final determined positions of the hubs to which they are assigned and the relationship between the respective completion times of the blocks and the hubs to which they are assigned to, each installation alternative being based on different initial assignments in said assign process; and output, to the output device, the final positions and completion times of each of the hubs, and to determine which blocks should be assigned to which hubs.

The systems of the present aspect can quickly form and output network catchment areas, taking the completion time of each premises into account. The catchment areas can also be formed without any overlapping which is particularly important for the implementation and maintenance of the network in practice.

In addition, the systems of the present aspect may enable network planners to specify the relatively importance of the time and space elements by assigning different weighting factors within the cost function to generate a preferable solution.

The systems of the present aspect may also be capable of identifying the optimum number of distribution hubs (and therefore catchment areas) to minimize the cabling distance required for installation and the time deviation between the completion times of the hubs and their associated blocks.

The cost function used includes weighting factors applied to both the geographical distance between the hub and the block and the difference between the respective completion times. This allows planners to put different emphasis on time and space to obtain desirable solutions. The choice of the weighting factors (or their relative weights) may be made based on the relative importance and/or financial cost or benefit of longer connection distances compared to earlier completion times.

In addition, both the location of each hub (for example to minimize the cabling distance between the hubs and its assigned blocks) and a priority order for the deployment of the hubs can be determined based on the final positions and completion times of the hubs.

By taking account of the capacity limitation of the hubs during the planning stage, the systems of this aspect can ensure that the capacity of the hubs is not exceeded and, preferably, that the optimum number of hubs is deployed.

Once the final positions and completion times have been output, the hubs can be installed in accordance with the final determined positions and completion times of each hub and the hubs connected to the customer blocks. This represents the final deployment of the network infrastructure in accordance with the determined arrangement and includes laying the physical cabling and connecting the respective units.

In certain embodiments when selecting said installation alternative, the processor may use a process such as a genetic algorithm, an ant colony optimization process or a simulated annealing process.

In certain embodiments the processor is further arranged to, after said determining step: check whether the selected block is also adjacent to one or more blocks already assigned to another of the distribution hubs; and if the selected block is adjacent to blocks assigned to another distribution hub: identify all such distribution hubs; determine the distribution hub amongst said identified distribution hubs for which the selected block has the lowest cost in said cost function; and when assigning, assign the selected block to the determined distribution hub.

Accordingly, in these embodiments, a clear decision can be made in relation to blocks which could potentially be assigned to more than one hub, such that the blocks assigned to a particular hub are contiguous and the most suitable for the position and completion time of that hub.

The processor may be arranged to update the position of the hub by changing its position to the centroid of the blocks assigned to that hub.

Alternatively or additionally, the processor may be arranged to update the completion time by checking if the completion time of the hub exceeds the completion time of the selected block and, if so, updating the completion time of the hub to the completion time of the selected block.

In addition, the system of the present aspect can re-apply the process several times within a big area to form clusters of clusters. For example, an entire exchange can be dissected into several PCPs (Primary Connection Points), and then each PCP can be further divided into DPs (Distribution Points) and the connections between each planned and implemented using the methods described above.

The system of the present aspect may include any combination of some, all or none of the above described preferred and optional features.

Embodiments of the present invention are methods and systems which preferably provide a framework which intelligently: (i) assigns customer premises to head end network equipment (i.e. FDH) based on the premises' completion times and locations, (ii) creates non-overlapping catchment areas, (iii) identifies the location of FDH within each catchment area and (iv) provides a list of priorities of which FDH needs to be deployed.

Figure 2:
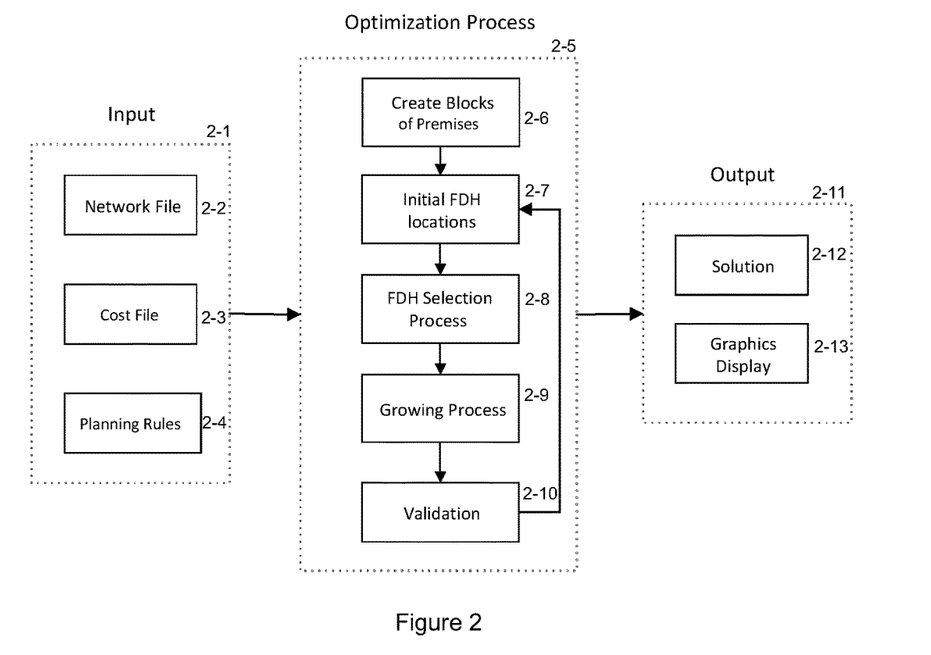
FIG. 2 is a schematic overview of a system according to an embodiment of the present invention.

FIG. 2 provides an overview of the system according to an embodiment of the present invention. The system contains 3 main modules: input 2-1, optimization process 2-5 and output 2-11.

The inputs 2-1 to the optimization process include a Network File 2-2 containing information about a new development area which specifies customer premises' locations and the completion times. A typical network area usually contains hundreds of customer premises, each having a fixed number of required connections. Since each catchment area is served by one FDH which has a limited capacity to provide a certain number of connections, the number of catchment areas also needs to be determined.

Cost information 2-3 containing the installation cost of FDHs and cables is also provided, and may be specific to the development, or may be generic, in which case it may be pre-loaded into the system, e.g. by storage in a memory device. A set of Planning Rules 2-4 are specified which include additional relevant data such as the maximum number of customer premises in each block, the maximum connection capacity of each FDH and the maximum allowable distance between each block and its associated FDH. Again, these may be provided with the information about the new development area (and may be specific to the development) or may be preprogramed and generic to a number of developments. In some embodiments, a user may select a particular Cost File 2-3 and Planning Rules 2-4 to use for a new development from a selection of pre-stored alternatives, depending on specific features of the development.

Figure 3:
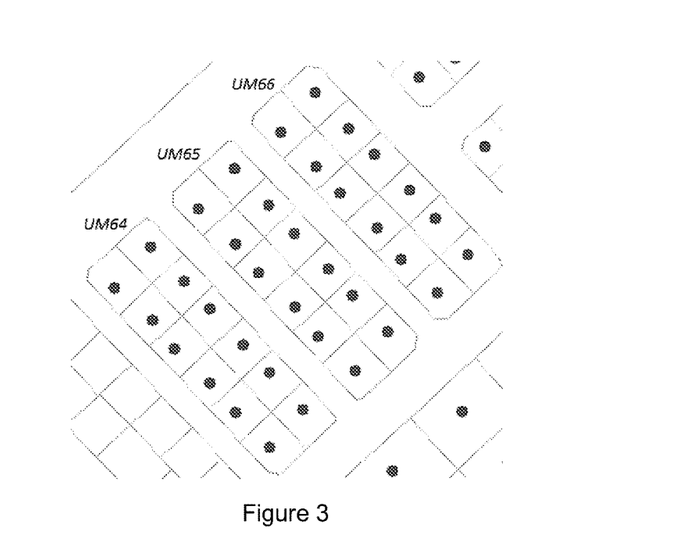
FIG. 3 illustrates a possible layout of three blocks of customer premises.

The first step 2-6 in the optimization process 2-5 of the present embodiment is to determine the blocks of customer premises, for example as shown in FIG. 3. This can be achieved in a number of ways. For example, the blocks can be: (i) formed by grouping together customer premises with the same or very similar completion time, (ii) based on the geographical constraints of each block that can only accommodate certain number of premises, or (iii) specified by a user of the system. For example, in FIG. 3, three customer blocks UM64, UM65 and UM66 are shown each of which contains 12 premises with the same completion time.

In the present embodiment, the centre of mass $\alpha_i$ for each customer block is calculated based on the equation (1) below. Once calculated, this is used to represent the premises in question as a single entity which will be referred to as a "block".

$$\alpha_i = \left( \frac{1}{n} \sum_{i \text{ is in Block } j} x_i, \frac{1}{n} \sum_{i \text{ is in Block } j} y_i \right) \quad (1)$$

where $x_i$ and $y_i$ represent the x-y coordinates of a customer premise i that belongs to block j, and n is the number of customers in the considered block.

During the initial stage 2-7 of determining the FDH locations, a set of FDHs are randomly generated over a set of all blocks β. Each FDH is initially taken to be the centre of the block $β_j$ to which it belongs.

A binary encoding scheme of the GA is used to identify which possible locations of FDHs m will be selected as a head end of each catchment area. For example, given a binary string representation {0 0 1 0 0 1 0 0 1 1 0}, the selected locations of FDHs will be situated in the third, sixth, ninth and tenth building blocks (i.e. m ⊂ β). In addition, the number of catchment areas in this case is equal to 4 which is the summation of 1's in the encoded string.

To achieve the objective with the consideration of completion time of each building block, the method of the present embodiment applies two steps: an "FDH selection process" 2-8 and a "Growing Process" 2-9.

For the FDH selection process, a genetic algorithm (GA) is applied to identify the FDH positions and determine the number of catchment areas. Other algorithms such as Ant Colony Optimization (ACO) or Simulated Annealing (SA) can be also used.

The second step is to associate the building blocks to the FDHs. This Growing Process 2-9 ensures that the assignment of building blocks to the FDH forms demarcated catchment areas with the consideration of time and space. In addition, a fitness value of the GA including the distances and the deviations of completion times between building blocks and their corresponding FDHs is calculated. The fitness value is an indication of how good the current candidate solution is. A validation process 2-10 is applied to check if all the building blocks representing the customer premises locations have been assigned to the selected FDHs. If it is not the case, a penalty is added to the fitness value which is then fed to the iterative process of the first FDH selection step (GA in this case) in order to re-adjust the FDH positions or add more FDHs until all the building blocks are assigned to the identified catchment areas with the minimum distances and deviations of completion times.

Figure 4:
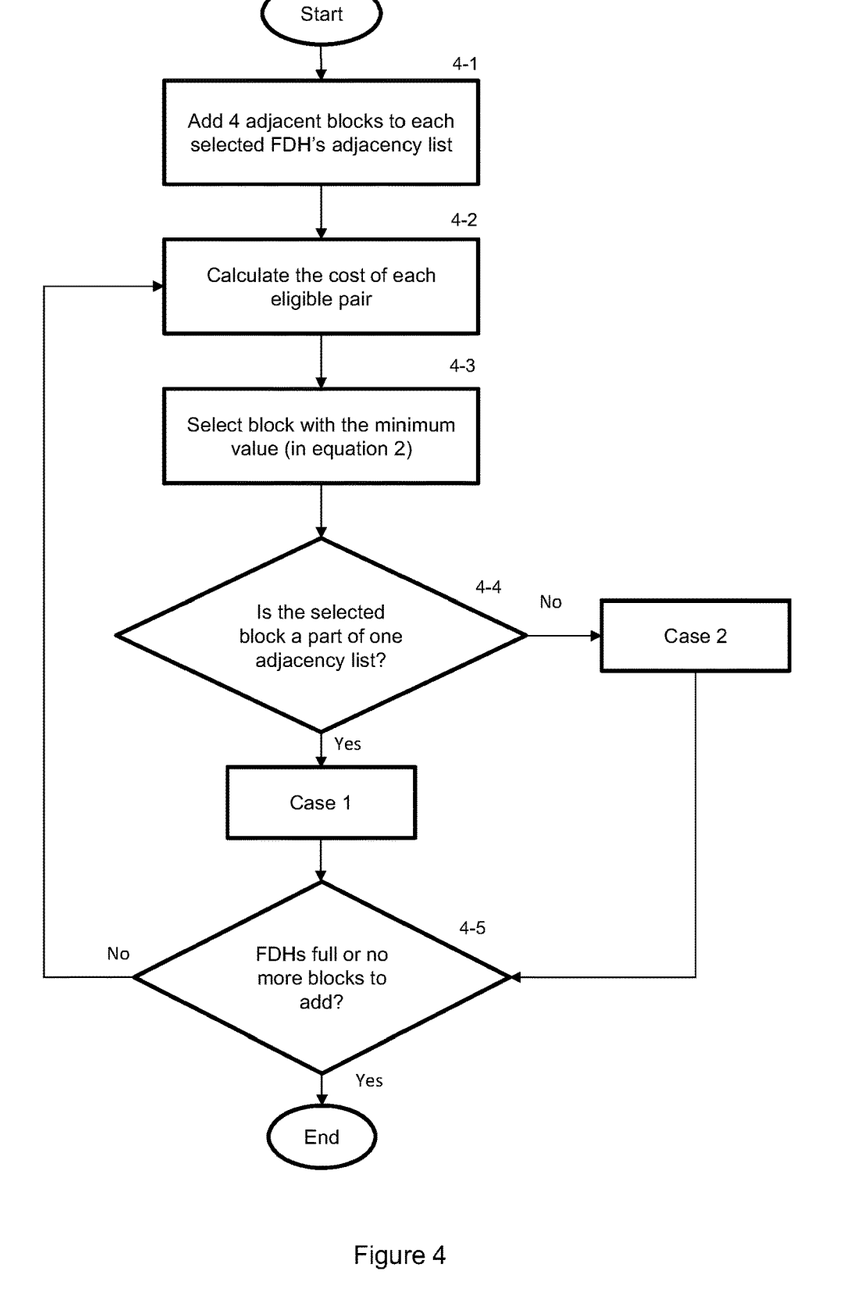
FIG. 4 is a flow chart showing the growing process of catchment area forming part of an embodiment of the present invention.

To ensure that each catchment area has a clear boundary, another step, namely growing process, is applied to "grow" the catchment area from each FDH original location to include the adjacent blocks. The growing process illustrated by the flow chart in FIG. 4 is described in more detail below.

Based on the initially selected FDH indices, an adjacency list is constructed for each FDH which is composed of top, bottom, left and right blocks (step 4-1). For each FDH, a cost function is calculated for each of the eligible blocks (i.e. the ones in the adjacency list) (step 4-2). Out of all eligible pairs, the one with the minimum value is selected (step 4-3). The minimum value is calculated using the equation 2 below.

$$\delta_m = \sum_{j \text{ is Block in } m} \text{Distance}(m, \alpha_j) \quad (2)$$

where $\delta_m$ is the distance between the FDH m and the block centroid $\alpha_j$; with both m and $\alpha_j$ representing geographical coordinates.

The function Distance (a, b) computes a distance between the two sets of coordinates. This can be a straight-line distance, a Manhattan distance, or an actual distance following a road path between the FDH and the building block.

Figure 5:
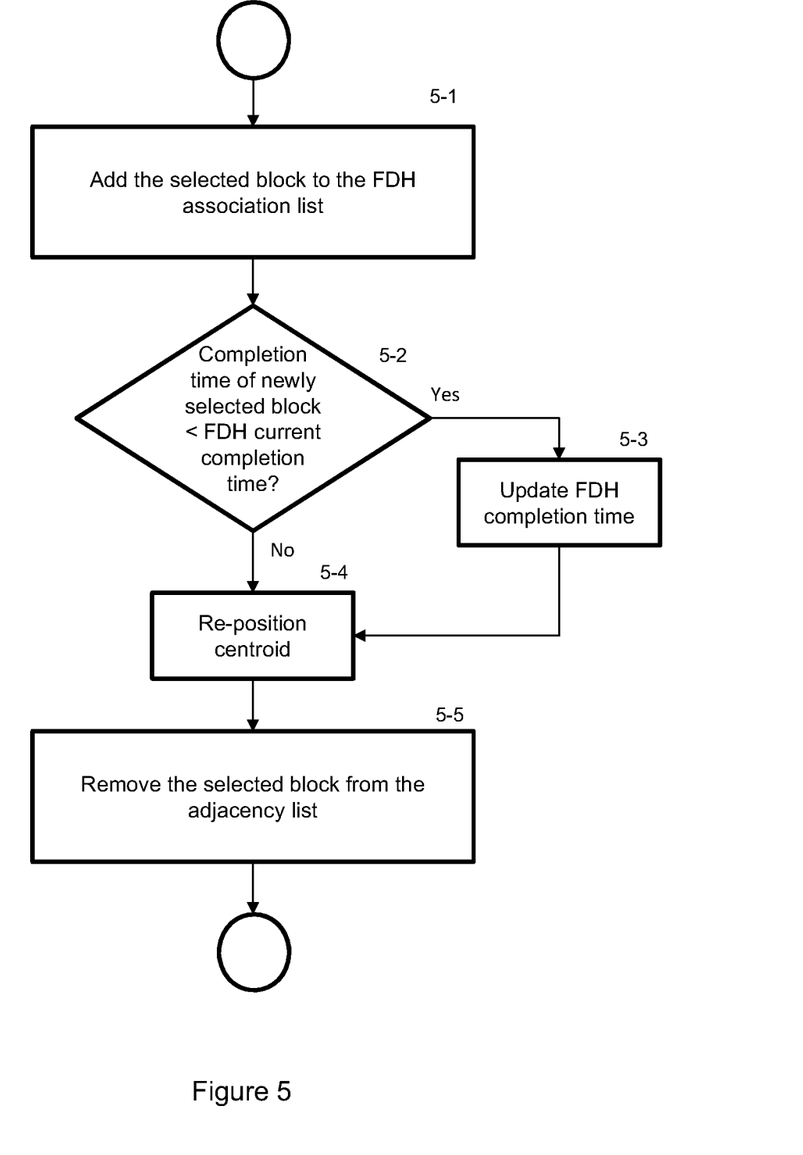
FIG. 5 is a flow chart showing one option resulting from step 4-4 of the process of FIG. 4.
Figure 6:
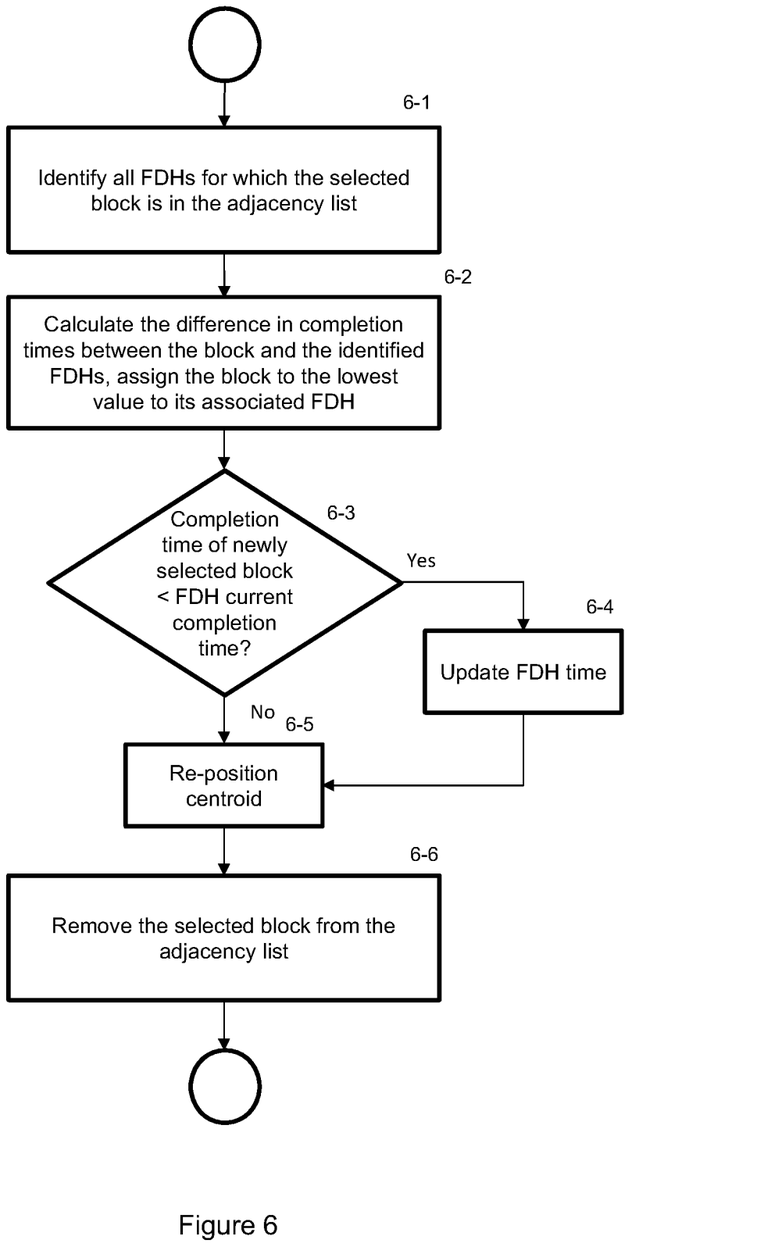
FIG. 6 is a flow chart showing a second option resulting from step 4-4 of the process of FIG. 4.

Next (step 4-4), it is determined whether the selected block is part of only one adjacency list, in which case it goes to case 1 (see FIG. 5), otherwise it goes to case 2 (see FIG. 6). In step 4-5, it is checked whether all the available blocks are assigned to the FDHs or some of the blocks can no longer be assigned to the FDHs even if they are not full. This is likely to happen when the blocks are at the edge or at the corner of a network and surrounded by the FDH catchment areas at full capacity. Due to the growing process, those "trapped" blocks cannot be assigned to any FDH with spare capacity as they are not allowed to connect (or cut) across the fully connected FDH catchment areas to form a demarcated catchment area. In both cases the growing process stops and, if the FDHs are full and blocks can no longer be assigned, then a penalty will be added to the fitness value. If there are still blocks to be assigned the process goes back to step 4-2 and repeats.

The two cases which can occur once a block is selected are as follows:

Case 1 (FIG. 5): This process is followed if the selected block belongs only to one adjacency list (i.e. it can be only a part of one FDH catchment area). In this case, the block is directly added to the FDH association list (step 5-1). The completion time of the newly selected block is checked against the current completion time of the FDH (step 5-2). If the completion time of the block is less than FDH completion time, the FDH completion time will be updated to the same value of the completion time of the newly selected block (step 5-3) to ensure that the FDH is also completed and can provide the required cabling to the new block. Once the completion time of FDH is updated (if necessary), the location of the FDH is re-positioned to the centroid among the new block and the previously assigned blocks (step 5-4). The new block is then removed from the adjacency list and added to the corresponding FDH (step 5-5).

Case 2 (FIG. 6): This process is followed if the selected block belongs to two or more adjacency lists of FDHs. In this situation, a decision needs to be made to determine which FDH should accommodate the selected block. In this case, all the FDHs adjacent to the so selected block are identified (step 6-1). Using equation 3 below, the block is added to the FDH which provides the minimum difference in completion time $T_{ij}$ between the selected block and one of FDHs in the adjacency list (step 6-2).

$$T_{ij} = \min_i |\text{completionTime}(m) - \text{completionTime}(\alpha_j)| \quad (3)$$

Then, in a similar manner to Case 1, the completion time of the newly selected block is compared with the FDH current completion time (step 6-3), and the time (if necessary) and the location of the chosen FDH are updated accordingly (steps 6-4 and 6-5). The selected block is removed from the adjacency list and added to the selected FDH (step 6-6). Finally, Equation 4 is used to calculate the difference (i.e. $\xi_m$) of the completion time between each FDH to its own set of assigned blocks.

$$\xi_m = \sum_{j \text{ is Block in } m} |\text{completionTime}(m) - \text{completionTime}(j)| \quad (4)$$

As mentioned earlier, the growing process terminates if all the FDHs reach their full capacities or if there are no more blocks to add (step 4-5). If some blocks remain unallocated and cannot be assigned to the adjacent FDHs, it would imply that a valid solution is not feasible, and a penalty will be added to a weighted cost function (5) to indicate the invalidity of the solution so that the GA will introduce more FDHs or reposition the existing FDHs during the next generation.

The weighted cost function in Equation 5 below is used to measure how good the solution is with the current FDH locations, based on the corresponding calculated distance $\delta_m$ and the completion time $\xi_m$ of each FDH to its associated blocks.

$$\phi = w_1 * (\Sigma_{m\ is\ FDH} \delta_m) + w_2 * (\Sigma_{m\ is\ FDH} \xi_m) + \text{penalty} \quad (5)$$

where $w_1$ and $w_2$ are weighting factors constrained by:

$$w_1 + w_2 = 1 \quad (6)$$

During the GA optimization process, a different number of FDHs with different locations and completion times, together with its associated blocks will be generated in order to minimize the weighted cost function (5). Different values of $w_1$ and $w_2$ can be set by network planners depending on their preferences for the formation of the catchment areas. For example, if they prefer to group the blocks of premises based on their close proximity, they can specify a higher value of $w_1$ and a lower value of $w_2$. On the other hand, if they prefer to group the premises based on their similar completion times, they can specify a higher value of $w_2$ and a lower value of $w_1$ instead.

The GA is executed until a pre-defined number of generations is reached or no more convergence of the cost function has been observed for a given number of generations. After the execution of the GA is completed, the number of catchment areas, the locations and the completion times of the FDHs, and the association of which block to which FDH will be identified according to the encoded solution string generated by the GA.

Once the completion times of all the FDHs have been determined, the priority of which FDH catchment area needs to be deployed is also identified. For example, if FDH_A's completion time is 120 days while the completion time of FDH_B is 90 days, FDH_B will be deployed first and connected to its associated premises within the same cluster.

RESULTS

In Table 1 below a small set of fabricated data is provided which describes the locations and the completion times of customer premises (or homes) of each block. There are 551 customer premises in total (i.e. nHomes (total)=551) and 100 blocks of homes. Each block has its own top-left co-ordinates (i.e. Block [1,1]) comprising a group of homes. For example, in Block [1,1], there are 5 homes (i.e. nHomes: 5) and the minimum completion time within the block is 88 (i.e. minCompletionTime:88). Each home has its own co-ordinates (e.g. x=1.801012984, y=1.180383053) and its completion time (e.g. 88.02827549) found in the first home of block [1,1]). In addition, homes in the same block have very similar completion time.

TABLE 1

| X | Y | Completion Time |
|---|---|---|
| nHomes (total): | 551 | |
| Block [1, 1] | | |
| nHomes: | 5 | |
| minCompletionTime: | 88 | |
| 1.801012984 | 1.180383053 | 88.02827549 |
| 1.311922165 | 1.955135943 | 88.82009252 |
| 1.312547874 | 1.482087271 | 88.18130066 |
| 1.044856383 | 1.227423301 | 88.87076677 |
| 1.353484057 | 1.165205936 | 88.1976629 |
| Block [1, 2] | | |
| nHomes: | 7 | |
| minCompletionTime: | 79 | |
| 1.994553615 | 2.986284892 | 79.91308206 |
| 1.628574692 | 2.964149077 | 79.94986323 |
| 1.233193193 | 2.194497349 | 79.55351306 |
| 1.795551585 | 2.760714652 | 79.52158869 |
| 1.525997557 | 2.448155426 | 79.0782389 |
| 1.293939788 | 2.217168425 | 79.7336169 |
| 1.170673699 | 2.035880166 | 79.53987528 |
| Block [1, 3] | | |
| nHomes: | 4 | |
| minCompletionTime: | 23 | |
| 1.7406401 | 3.584850481 | 23.62734957 |
| 1.049978794 | 3.964831026 | 23.72503121 |
| 1.891338606 | 3.728559897 | 23.73640561 |
| 1.105171154 | 3.472479673 | 23.38425089 |
| Block [1, 4] | | |
| nHomes: | 7 | |
| minCompletionTime: | 92 | |
| 1.162692082 | 4.416561817 | 92.40617826 |
| 1.33001305 | 4.281028623 | 92.42302025 |
| 1.72663921 | 4.797874181 | 92.81829565 |
| 1.680952187 | 4.740842689 | 92.43761189 |
| 1.962757942 | 4.133138883 | 92.86309929 |
| 1.970436448 | 4.59420962 | 92.49000376 |
| 1.662727936 | 4.025160509 | 92.46025416 |
| Block [1, 5] | | |
| nHomes: | 3 | |
| minCompletionTime: | 80 | |
| 1.480954652 | 5.611331936 | 80.01260803 |
| 1.901921121 | 5.79433747 | 80.08352871 |
| 1.190933975 | 5.247131812 | 80.36075794 |
| Block [1, 6] | | |
| nHomes: | 1 | |
| minCompletionTime: | 27 | |
| 1.290343326 | 6.761544389 | 27.36077905 |
| Block [1, 7] | | |
| nHomes: | 3 | |
| minCompletionTime: | 40 | |
| 1.803588371 | 7.460633127 | 40.330176 |
| 1.531090223 | 7.790100046 | 40.02510693 |
| 1.668704637 | 7.49638142 | 40.89140773 |
| Block [1, 8] | | |
| nHomes: | 5 | |
| minCompletionTime: | 79 | |
| 1.905680144 | 8.351252448 | 79.58611167 |
| 1.395356595 | 8.704696218 | 79.20122376 |
| 1.6574607 | 8.895041946 | 79.79782283 |
| 1.389226329 | 8.132721488 | 79.0365721 |
| 1.653878715 | 8.879063368 | 79.14590749 |

Figure 7:
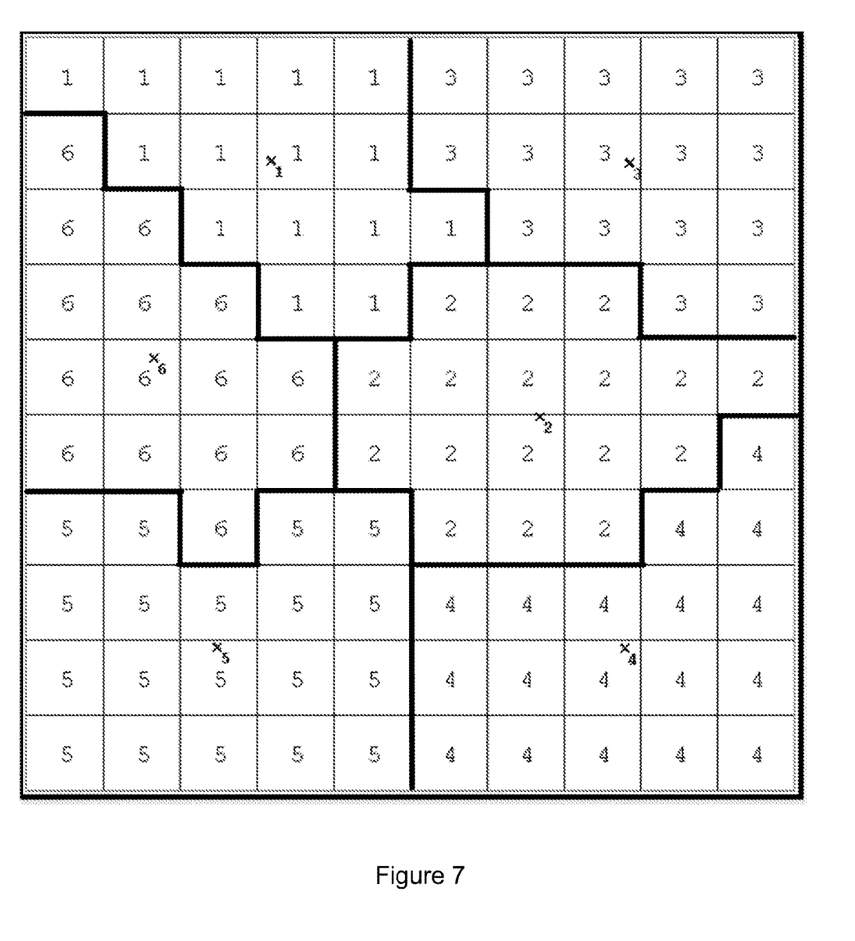
FIGS. 7 & 8 show two examples of FDH locations after running a method according to an embodiment of the present invention on a simulated network using different weightings.
Figure 8:
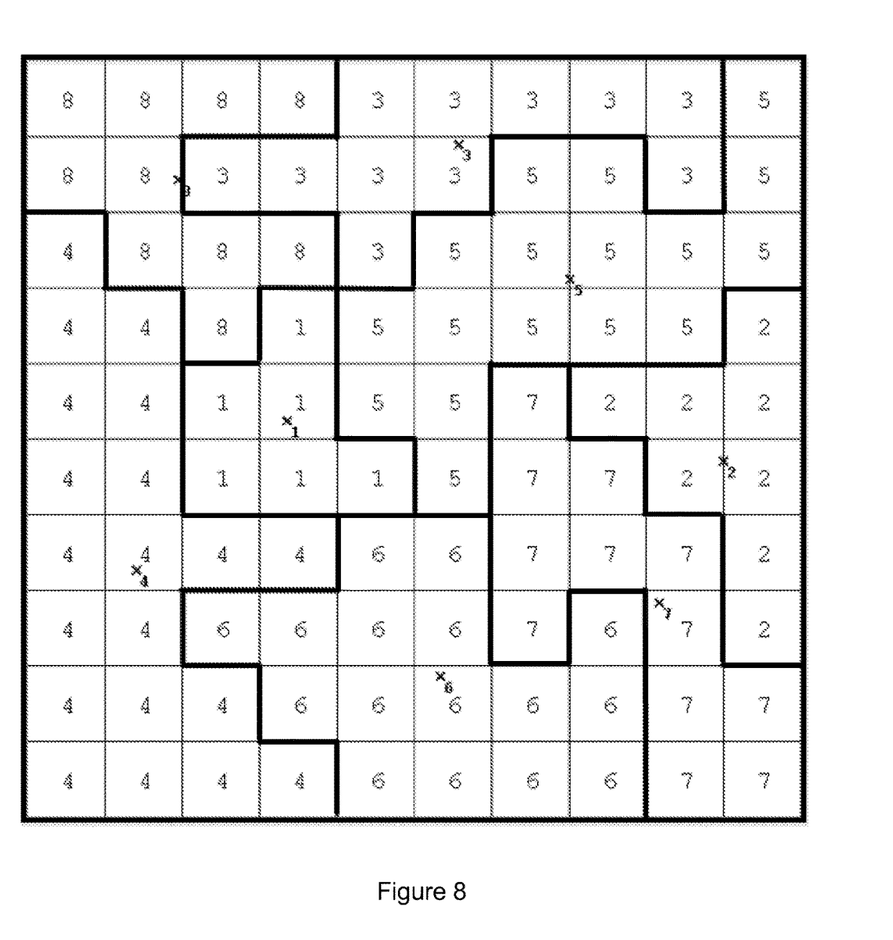

The data in Table 1 above is fed to the system as a network file 2-2 and the results of applying methods according to different embodiments of the present invention are shown in FIGS. 7 and 8.

FIGS. 7 and 8 illustrate two cases of FDH locations after running the method of generating FDH catchment areas based on a simulated collection of customer premises with different values of $w_1$ and $w_2$. In FIG. 7, $w_1$ and $w_2$ were set to 1 and 0 respectively while in FIG. 8, $w_1$ and $w_2$ were set to 0.8 and 0.2. The crosses in FIGS. 7 and 8 indicate the locations of FDHs and the number next to the cross represents the priority of which a FDH needs to be built first. The number shown in each block represents which FDH it belongs to. For example, a cross with the value 8 denotes the lowest priority of FDH needed to be built, whilst a cross with the value 1 shows the highest priority. As mentioned earlier, the weight $w_1$ is related to the distance to the selected FDH. In FIG. 7, setting $w_1$ and $w_2$ to 1 and 0 respectively suggests that the network planner, for example, would like to minimize the cabling distance as much as possible between a FDH and its connected blocks without taking the completion time into account. Therefore, the location of FDH will be almost situated at the centre of the catchment area to minimize the cabling distance.

FIG. 8 shows how, for the same underlying network file, less well-defined catchment areas arise when greater emphasis is put on the completion time $w_2$. This can be explained by the fact that customer premises with a similar completion time are more sparsely distributed. When a relatively higher value of $w_2$ was used, the system generates a solution which also minimizes the time deviations between the selected FDH and its associated blocks, since $w_2$ is a non-zero number.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] WO2013169200A1
[2] WO02010112845A1
[3] US20030099014A1
[4] EP2426837A1
[5] WO 2016026656 A1
[6] US 20100149984 A1
[7] Y. Kim, Y. Lee, and J. Han, "A splitter location/allocation problem in designing fibre optic access networks," European Journal of Operational Research, vol. 210, no. 2, pp. 425-435, April 2011.
[8] J. Li and G. Shen, "Cost minimization planning for Greenfield passive optical networks," Optical Communications and Networking, IEEE/OSA Journal of, vol. 1, no. 1, pp. 17-29, June 2009.
[9] B. Lakic and M. Hajduczenia, "On optimized passive optical network (PON) deployment," in Access Networks Workshops, 2007. AccessNets '07. Second International Conference on, 2007, pp. 1-8.

All references referred to above are hereby incorporated by reference.

The invention claimed is:

1. A method of installing a telecommunications network, the network including:
a plurality of customer blocks, each having a geographical position and a completion time associated with it; and
a plurality of distribution hubs which will connect said customer blocks to the network infrastructure when the network is created:
wherein the method includes the steps of:
procuring the distribution hubs;
assigning, to each distribution hub, an initial geographical position, an initial completion time; an initially assigned customer block, and a maximum number of customer blocks that can be assigned to it, wherein the initial geographical position of the distribution hub is within its initially assigned customer block,
concurrently, for each distribution hub, and repeatedly, until all of the customer blocks have been assigned to a hub, or all hubs have their maximum number of customer blocks assigned to them:
a) determining a customer block to be assigned to each hub by selecting, from among the group of customer blocks adjacent to blocks already assigned to that hub, the customer block which has the lowest value in a distance function that takes account of the relative geographical relationship between the block and the hub;
b) assigning the selected block to the hub; and
c) updating the position and completion time of the hub to take account of the position and completion time of the newly-assigned block,
selecting, from a plurality of potential installation alternatives produced by said repeating steps, the installation alternative that optimises a cost function that takes account of both the relative geographical relationship between the blocks and the final determined positions of the hubs to which they are assigned and the relationship between the respective completion times of the blocks and the hubs to which they are assigned to, each installation alternative being based on different initial assignments in said assigning step;

installing the hubs in accordance with the final determined positions and completion times of each hub in said selected installation alternative; and connecting the hubs to the customer blocks.

2. A method according to claim 1, further including the steps of, after said determining step:

checking whether the selected block is also adjacent to one or more blocks already assigned to another of the distribution hubs; and if the selected block is adjacent to blocks assigned to another distribution hub:
identifying all such distribution hubs;
determining the distribution hub amongst said identified distribution hubs for which the selected block has the smallest difference between the completion time of the selected block and the completion time of the respective distribution hub; and
in said step of assigning, assigning the selected block to the determined distribution hub.

3. A method according to claim 1 wherein the step of updating includes updating the position of the hub by changing its position to the centroid of the blocks assigned to that hub.

4. A method according to claim 1 wherein the step of updating includes: checking if the completion time of the hub exceeds the completion time of the selected block and, if so, updating the completion time of the hub to the completion time of the selected block.

5. A system for planning the configuration of a new telecommunications infrastructure network, the network including:

a plurality of customer blocks, each having a geographical position and a completion time associated with it; and a plurality of distribution hubs which will connect said customer blocks to existing network infrastructure when the network is created, wherein the system includes a processor, a memory and an output device, the memory is arranged store a geographical position and a completion time associated with each of said blocks; and the processor is arranged to:
assign, to each distribution hub, an initial geographical position, an initial completion time, an initially assigned customer block, and a maximum number of customer blocks that can be assigned to it, wherein the initial geographical position of the distribution hub is within its initial customer block, concurrently, for each distribution hub, and repeatedly, until all of the customer blocks have been assigned to a hub, or all hubs have their maximum number of customer blocks assigned to them:
a) determine a customer block to be assigned to each hub by selecting, from among the group of customer blocks adjacent to blocks already assigned to that hub, the customer block which has the lowest value in a distance function that takes account of the relative geographical relationship between the block and the hub;
b) assign the selected block to the hub; and
c) update the position and completion time of the hub to take account of the position and completion time of the newly-assigned block, select, from a plurality of potential installation alternatives produced by said repeating steps, the installation alternative that optimises a cost function that takes account of both the relative geographical relationship between the blocks and the final determined positions of the hubs to which they are assigned and the relationship between the respective completion times of the blocks and the hubs to which they are assigned to, each installation alternative being based on different initial assignments in said assign process; and output, to the output device, the final positions and completion times of each of the hubs, and to determine which blocks should be assigned to which hubs.

6. A system according to claim 5, wherein the processor is further arranged to, after said determining step:

check whether the selected block is also adjacent to one or more blocks already assigned to another of the distribution hubs; and if the selected block is adjacent to blocks assigned to another distribution hub:
identify all such distribution hubs;
determine the distribution hub amongst said identified distribution hubs for which the selected block has the lowest cost in said cost function; and
when assigning, assign the selected block to the determined distribution hub.

7. A system according to claim 5 wherein the processor is arranged to update the position of the hub by changing its position to the centroid of the blocks assigned to that hub.

8. A system according to claim 5 wherein the processor is arranged to update the completion time by checking if the completion time of the hub exceeds the completion time of the selected block and, if so, updating the completion time of the hub to the completion time of the selected block.

* * * * *